Jan. 9, 1934.  S. WIDMER  1,943,250

ANODE GRID STRUCTURE

Filed Nov. 16, 1931

Inventor
Stefan Widmer
by
Attorney

Patented Jan. 9, 1934

1,943,250

UNITED STATES PATENT OFFICE 1,943,250

ANODE GRID STRUCTURE

Stefan Widmer, Baden, Switzerland, assignor to Aktiengesellschaft Brown Boveri & Cie., Baden, Switzerland, a joint-stock company of Switzerland Application November 16, 1931, Serial No. 575,488, and in Germany October 11, 1930

4 Claims. (Cl. 250—27.5)

An application has been filed in Germany October 11, 1930.

This invention relates to improvements in means for controlling the arc which provides the valve action in an electric current rectifier of the metallic vapor type and more particularly to grid structures for use within the arc guides suspended from the anodes of such rectifiers.

The use of grids within the arc guides for the anodes of an electric current rectifier of the metallic vapor type for the purpose of preventing backfires or reverse flow of current through the rectifier is already well known. Such grids generally depend for their effectiveness on their heating effect which causes a decrease in the vapor pressure within the arc guide and thus decreases the danger of backfires or, when a potential is impressed on the grids, depend on the repulsive effect of the impressed charge upon the negatively charged ions or molecules of metallic vapor approaching the grids. Grids in the form of wire mesh or as plates or hollow cylinders arranged within the arc guide have been used, but none of such structures completely fulfilled the desired purpose even though a plurality of grids were arranged above each other within the guide and even though some of such plurality of grids were charged while others of the grids were used merely for heating purposes. Even the use of a separate wire mesh grid and a grid formed of plates or cylinders in the same arc guide has been found to be insufficient to obtain the desired control of the charged particles of metallic vapor carrying the arc within the rectifier.

It is, therefore, among the objects of the present invention to provide a grid structure for electric power rectifiers of the metallic vapor arcing type in which a combined wire mesh and plate grid are used.

Another object of the invention is to provide a grid structure for electric power rectifiers in which a wire mesh grid is directly connected with a plate grid, both of such grids being arranged within the arc guides depending from the anodes.

Another object of the invention is to provide a grid structure for electric power rectifiers in which a wire mesh grid is both mechanically and electrically connected with a plate grid.

Figure 1:
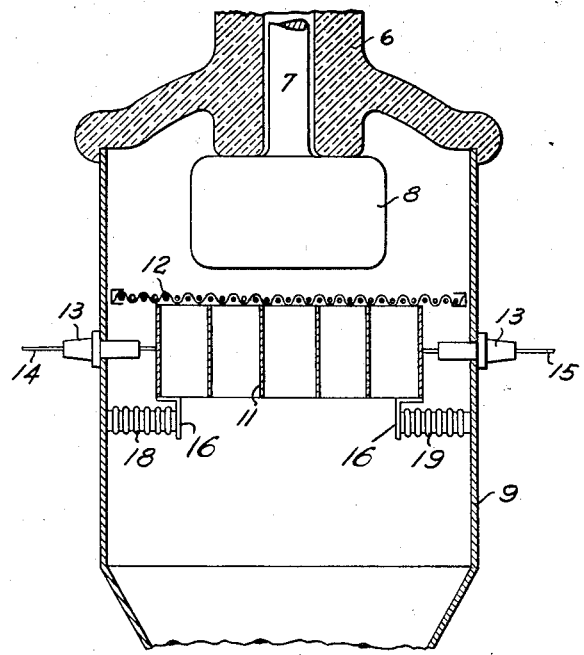
Figure 2:
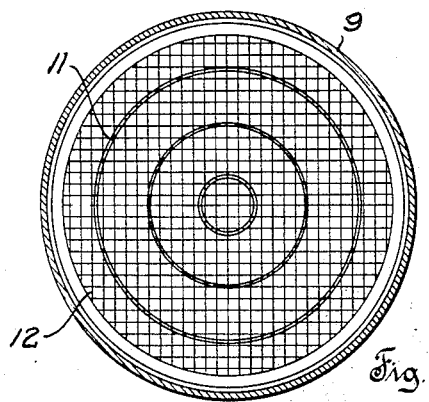
Figure 3:
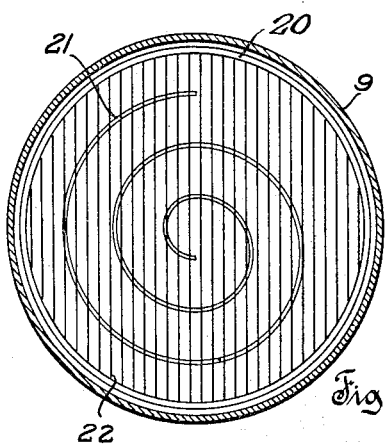
Figure 4:
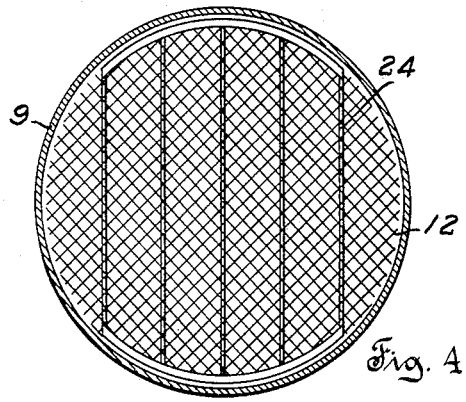

Objects and advantages, other than those above set forth, will be apparent from the following description when read in connection with the accompanying drawing forming a part of the present disclosure in which Figure 1 is a partial vertical sectional view of an anode structure of an electric power rectifier of the metallic vapor arc type employing a combined wire mesh and plate grid structure for controlling the action of the arc flowing from the anode, Figure 2 is a top view of the grid structure shown in Figure 1; and Figures 3 and 4 are views similar to that shown in Figure 2, but showing modified structures of one portion of the combined grid structure.

Referring more particularly to the drawing by characters of reference, the reference numeral 6 designates an insulator which is arranged to extend through the top of an electrical power rectifier of the metallic vapor arcing type of the usual construction which is therefore not shown. An anode comprising a stem portion 7 and a head portion 8 is associated with the insulator 6, the stem 7 extending through the insulator to the exterior of the rectifier for the connection of an electric conductor thereto and the head 8 closing the central passageway for the stem through the insulator. A substantially cylindrical member 9 forming means for guiding the arc flowing from the anode to the cathode (not shown) of the rectifier is suspended from the insulator 6 and partially incloses the anode head 8, the end of the arc guide 9 opposite the anode head 8 being open and being directed toward the vaporizable cathode of the rectifier.

A grid structure comprising a plate grid 11 and a wire mesh grid 12 is supported within the arc guide 9 between the anode head 8 and the open end of the arc guide upon insulators 13. The plate grid 11 and the wire grid 12 are both mechanically and electrically connected by welding, or by otherwise affixing the plate members 11 to the mesh grid 12 and the combined structure supported by resting the outer one of the plates 11 on suitable brackets such as 16 affixed to insulators 18, 19 fastened in the sleeve 9. Electrical conductors 14 and 15 are connected with the grid 11 and are brought out through the arc guide 9 by means of insulating bushings 13 to an external source of potential (not shown) for the purpose of applying a control potential to the grids as is well known.

As shown in Figs. 1 and 2 the plate grid 11 may be in the form of a plurality of concentric cylinders which may be spaced a uniform distance from the arc guide 9 and from each other or may be spaced at unequal distances as may be desired. Under some circumstances it is desirable that the concentric cylinder grid structure 11 be replaced by a structure as shown at 21 in Fig. 3 which is a single strip of metal in the form of an Archimedean spiral eccentrically located within the arc guide and it may also be desirable to replace the wire mesh 12 shown in Figures 1 and 2 by a plurality of parallel arranged wires 22 as shown in Figure 3. In such an assembly the strip 21 may, preferably, be welded to the wire members 22 which in turn may be welded to a metal ring as 20 and the whole thereby insulatingly supported in the sleeve 9 in manner such as shown in Figure 1. Figure 4 illustrates a plate grid 24 formed from a plurality of parallel arranged separate strips of metal extending across the arc guide in planes substantially parallel to the axis of the arc guide. As in the embodiment, according to Figs. 1 and 2, the strips 24 may be affixed to the wire grid 12 by welding or otherwise and supported in a sleeve 9 on suitable members similar to the brackets 12 and insulators 18, 19. The results obtained by the present invention are not dependent upon the specific forms of the separate grid structures but rather upon the action of the combined structure as may be seen from the above description of suitable means for obtaining the desired result.

The use of a mechanically and electrically combined or connected grid of wire mesh and of plates permits the effective blocking off of an anode relative to the cathode of a rectifier due to the fact that the plate grid structure absorbs the residual charge after the arc has ceased flowing from the anode and the wire grid prevents any great number of metallic ions from reaching the anode. The above result is due to the fact that the arc guide is both mechanically and electrically blocked which insures against backfires. The relatively small mesh wire grid is very highly heated during the time the arc is flowing from the anode to the cathode because the wire mesh is relatively close and is arranged close to the anode and between the anode and the plate grid in such manner that any gases in the vicinity of the wire grid, when the flow of the arc is to be blocked, are very highly heated which causes expansion of such gases and thus reduces the vapor pressure within the arc guide. The danger of backfires is thus greatly decreased. As a result of the mechanical connection of the grids a heat transfer takes place from the wire grid to the plate grid whereby the latter is also maintained at a relatively high temperature thus aiding in the diffusing action upon the gases and vapors present within the arc guide in addition to the space charge impressed upon the plate grid from the source of control potential.

The spacing of the entire or combined grid structure from the anode may be varied as desired, but the axial length of the plate grid portions depends upon the spacing of the several plates from each other and from the arc guide i. e. the greater the spacing of the several plates the greater will be the axial length required in the plate grid structure to produce such space charge within the arc guide as will secure a sufficiently complete repulsive action on the negatively charged particles of vapor rising from the cathode.

Although but a few embodiments of the invention have been illustrated and described, it will be apparent to those skilled in the art that various changes and modifications may be made therein without departing from the spirit of the invention or from the scope of the appended claims.

The invention claimed is:

1. In combination with an electric current rectifier of the vapor arcing type having an electrode constituting a terminal for the establishment of arcs thereto, of a grid structure arranged within the path of said arcs comprising an element formed of plates extending substantially parallel to the longitudinal axis of said arc path of such length and so spaced relative to each other as to establish such electric space charge therebetween as to control the flow of electrons and ions in said path, and a wire mesh element extending transversely to the longitudinal axis of said path, the said mesh element being supported intermediate said electrode and said plates in direct mechanical contact with the latter to thereby absorb the heat of arcs flowing in said path whereby the density of vapor about said electrode is reduced during momentary non-operating periods thereof.

2. In combination with an electric current rectifier of the vapor arcing type having an anode and an arc guide arranged thereabout, of a grid structure disposed within said guide comprising an element formed of plates extending axially of said guide and so spaced relative to each other as to establish electric space charges therebetween to of such magnitude as to control the flow of electrons and ions through said guide, and a wire mesh element extending transversely to said plates in direct mechanical contact therewith and operable to heat the space thereabout to thereby reduce the density of vapor about said anode.

3. In combination with an electric current rectifier of the vapor arcing type having an anode and an arc guide arranged thereabout, of a grid structure disposed within said guide comprising an element formed of plates extending axially of said guide and so spaced relative to each other as to establish electric space charges therebetween of such magnitude as to control the flow of electrons and ions through said guide, and a wire mesh element extending transversely of said plates in direct mechanical contact and electrical connection therewith operable to heat the space thereabout whereby the density of the vapor about said anode is reduced.

4. In combination with an electric current rectifier of the vapor arcing type having an anode and an arc guide arranged thereabout, of a grid structure disposed within said guide comprising an element formed of plates extending substantially parallel to the longitudinal axis of said guide and so spaced relative to each other as to establish electric charges therebetween of such magnitude as to control the flow of electrons and ions within said guide, and a wire mesh element extending transversely to the longitudinal axis of said guide, the said mesh element being in direct mechanical contact and electrical connection with said plates and being so dimensioned as to absorb the heat of arcs flowing through said guide to thereby reduce the density of vapor about said anode during momentary non-operating periods thereof, and means supporting said elements within said guide in insulated relation therewith.

STEFAN WIDMER.